(12) United States Patent
Jin et al.

(10) Patent No.: US 8,773,788 B2
(45) Date of Patent: Jul. 8, 2014

(54) SYSTEMS AND METHODS FOR HARDWARE ASSISTED WRITE PRE-COMPENSATION ENHANCEMENT

(75) Inventors: Ming Jin, Fremont, CA (US); Shaohua Yang, San Jose, CA (US); Haitao Xia, San Jose, CA (US); Fan Zhang, Milpitas, CA (US)

(73) Assignee: LSI Corporation, San Jose, CA (US)

( * ) Notice: Subject to any disclaimer, the term of this patent is extended or adjusted under 35 U.S.C. 154(b) by 66 days.

(21) Appl. No.: 13/545,348

(22) Filed: Jul. 10, 2012

(65) Prior Publication Data

US 2014/0016220 A1 Jan. 16, 2014

(51) Int. Cl.
*G11B 27/36* (2006.01)
*G11B 5/00* (2006.01)

(52) U.S. Cl.
USPC .......................................... 360/31; 369/47.53

(58) Field of Classification Search
USPC ............ 360/31, 75, 77.07, 68, 66, 51, 46, 55; 369/47.52, 47.53, 47.27, 47.5, 47.51
See application file for complete search history.

(56) References Cited

U.S. PATENT DOCUMENTS

| | | | |
|---|---|---|---|
| 6,301,068 B1 | 10/2001 | Ionescu | |
| 6,696,832 B2 * | 2/2004 | Chew et al. | 324/210 |
| 7,154,827 B2 * | 12/2006 | Tokita et al. | 369/47.53 |
| 7,423,827 B2 | 9/2008 | Neville | |
| 7,680,217 B2 | 3/2010 | Wilson | |
| 7,800,999 B2 * | 9/2010 | Muramatsu et al. | 369/47.53 |
| 7,869,158 B1 * | 1/2011 | Cheung et al. | 360/77.07 |
| 7,880,988 B2 * | 2/2011 | Ahn | 360/31 |
| 7,929,240 B2 | 4/2011 | Mathew | |
| 2011/0242691 A1 | 10/2011 | Burger | |

OTHER PUBLICATIONS

Scholz et al., "Micromagnetic Modeling of Head Field Rise Time for High Data-Rate Recording", IEEE Transactions on Magnetics, vol. 41, Issue 2, pp. 702-706 (Feb. 2005).
Taratorin et al., "Media saturation and overwrite in perpendicular recording", IEEE Transactions on Magnetics, vol. 42, Issue 2, pp. 157 Œ 162 (2006).
U.S. Appl. No. 13/524,462, filed Jun. 15, 2012, Nayak Ratnakar Aravind, Unpublished.
U.S. Appl. No. 13/362,466, filed Jan. 31, 2012, Nayak Ratnakar Aravind, Unpublished.
U.S. Appl. No. 13/472,448, filed May 15, 2012, Ross S. Wilson, Unpublished.
U.S. Appl. No. 13/302,169, filed Nov. 22, 2011, Boris Livshitz, Unpublished.
U.S. Appl. No. 13/113,210, filed May 23, 2011, Xun Zhang, Unpublished.
U.S. Appl. No. 13/100,063, filed May 3, 2011, Ming Jin, Unpublished.
U.S. Appl. No. 13/096,900, filed Apr. 28, 2011, Ross S. Wilson, Unpublished.

\* cited by examiner

*Primary Examiner* — Nabil Hindi
(74) *Attorney, Agent, or Firm* — Hamilton DeSanctis & Cha (57) ABSTRACT

Various embodiments of the present invention provide systems and methods for calibrating write pre-compensation values.

21 Claims, 5 Drawing Sheets

SYSTEMS AND METHODS FOR HARDWARE ASSISTED WRITE PRE-COMPENSATION ENHANCEMENT

BACKGROUND OF THE INVENTION

The present inventions are related to systems and methods for writing information to a magnetic storage medium, and more particularly to systems and methods calibrating pre-compensation circuitry for use during a storage medium write.

Writing information to a magnetic storage medium includes generating a magnetic field in close proximity to the storage medium to be written. This may be done using a read/write head assembly as are commonly known in the art. One problem with such an approach to writing a magnetic storage medium is that the magnetic field generated during the write of a preceding bit pattern may interfere or otherwise affect a magnetic field generated during a write of a succeeding bit pattern. In particular, a magnetic field generated to write a current bit pattern may exhibit a non-linear transition shift (NLTS) caused by magnetic interactions between write-field and already written transitions. Presence of NLTS leads to data-dependent nonlinear distortions in the read back signal, causing degradation in data-recovery performance. Further, where NLTS becomes significant, the media exhibiting the NLTS may be disqualified, thus resulting in poor yield of the media. Various systems employ a write pre-compensation scheme that considers preceding bit patterns in the process of generating a magnetic field to write a succeeding bit pattern. Such systems may not operate very well.

Hence, for at least the aforementioned reasons, there exists a need in the art for advanced systems and methods for write pre-compensation.

BRIEF SUMMARY OF THE INVENTION

The present inventions are related to systems and methods for writing information to a magnetic storage medium, and more particularly to systems and methods calibrating pre-compensation circuitry for use during a storage medium write.

One or more embodiments of the present invention provide calibration circuits that include a counter circuit, a write circuit, a read circuit, and a pre-compensation value selector circuit. The counter circuit is operable to generate a first pre-compensation value corresponding to a first count output of the counter circuit, and to generate a second pre-compensation value corresponding to a second count output of the counter circuit. The write circuit is operable to write data to a first region of a storage medium using the first pre-compensation value, and to write data to a second region of the storage medium using the second pre-compensation value. The read circuit is operable to read the first region to yield a first read data set, and to calculate a first quality corresponding to the first data set, and to read the second region to yield a second read data set, and to calculate a first quality corresponding to the first data set. The pre-compensation value selector circuit operable to select one of the first pre-compensation value and the second pre-compensation value based at least in part on the first quality and the second quality.

This summary provides only a general outline of some embodiments of the invention. The phrases "in one embodiment," "according to one embodiment," "various embodiments", "one or more embodiments", "particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 2b graphically depicts an example write pre-compensation calibration process that may be implemented by the data read/write circuit of FIG. 1 including the write pre-compensation calibration circuit of FIG. 2a;

DETAILED DESCRIPTION OF THE INVENTION

The present inventions are related to systems and methods for writing information to a magnetic storage medium, and more particularly to systems and methods calibrating pre-compensation circuitry for use during a storage medium write.

Various embodiments of the present invention provide data storage systems that include storage media with a number of regions. A head is disposed over the storage medium and is operable to write data to the storage medium and to read data previously stored to the storage medium. The data written to the storage medium is provided by a read channel circuit, and the same read channel circuit is operable to process data received from the head. Data written to the storage medium is pre-compensated by a write pre-compensation circuit using a write pre-compensation value stored during a calibration operation. A write pre-compensation calibration circuit is included as part of the read channel circuit and operates to determine the aforementioned write pre-compensation value that corresponds to a particular region of the storage medium. In particular, the write pre-compensation calibration circuit generates a series of write pre-compensation values that are each used to write a sub-region of a given region of the storage medium. The sub-regions are then read and processed. The processing yields a quality of the read data set, and the sub-region of the given region exhibiting the highest quality is selected. The write pre-compensation value used in relation to the selected sub-region is identified and stored for use in later data writes to the storage medium. In some embodiments of the present invention, the given region is a track on a storage medium, and each of the sub-regions are sectors on the track. Any indication of quality of the read data set may be used in relation to different embodiments of the present invention. For example, a bit error rate for the sub-region, a sum of the log-likelihood ratio values (i.e., soft values for the data) within the sub-sub-region, or a minimum mean squared error value within the sub-region may be used in accordance with different embodiments of the present invention.

Various embodiments of the present invention provide storage devices that include a storage medium and a calibration circuit. The storage medium includes a region and at least a first sub-region and a second sub-region within the region. The calibration circuit is operable to: generate a first pre-compensation value and a second pre-compensation value; write data to the first sub-region using the first pre-compensation value; write data to the second sub-region using the second pre-compensation value; read the first sub-region; calculate a first quality of a data set read from the first sub-region; read the second sub-region; calculate a second quality of a data set read from the second sub-region; and based at least in part on the first quality and the second quality, select one of the first pre-compensation value and the second pre-compensation value as a selected pre-compensation value.

In some instances of the aforementioned embodiments, the first quality may be, but is not limited to, a bit error rate of the first sub-region, a sum of the log-likelihood ratio values within the first sub-region, or a minimum mean squared error value within the first sub-region. In various instances of the aforementioned embodiments, the device further includes a memory operable to store the selected pre-compensation value. In one or more embodiments of the present invention, the calibration circuit is implemented as part of an integrated circuit. In some instances of the aforementioned embodiments, the storage device includes a solid state memory.

In some cases, the calibration circuit includes a counter circuit that is incremented to generate the first pre-compensation value and the second pre-compensation value. In some instances of the aforementioned embodiments, the first quality indicates a greater quality than the second quality, and the first pre-compensation value is selected as the selected pre-compensation value.

One or more embodiments of the present invention provide calibration circuits that include a counter circuit, a write circuit, a read circuit, and a pre-compensation value selector circuit. The counter circuit is operable to generate a first pre-compensation value corresponding to a first count output of the counter circuit, and to generate a second pre-compensation value corresponding to a second count output of the counter circuit. The write circuit is operable to write data to a first region of a storage medium using the first pre-compensation value, and to write data to a second region of the storage medium using the second pre-compensation value. The read circuit is operable to read the first region to yield a first read data set, and to calculate a first quality corresponding to the first data set, and to read the second region to yield a second read data set, and to calculate a first quality corresponding to the first data set. The pre-compensation value selector circuit operable to select one of the first pre-compensation value and the second pre-compensation value based at least in part on the first quality and the second quality.

Other embodiments of the present invention provide methods for pre-compensation calibration. The methods include: generating a first pre-compensation value and a second pre-compensation value using a counter circuit; writing data to a first region of a storage medium using the first pre-compensation value; writing data to a second region of the storage medium using the second pre-compensation value; reading the first region to yield a first data set; calculating a first quality of the first data set; reading the second region to yield a second data set; calculating a second quality of the second data set; and based at least in part on the first quality and the second quality, selecting one of the first pre-compensation value and the second pre-compensation value as a selected pre-compensation value.

Figure 1:
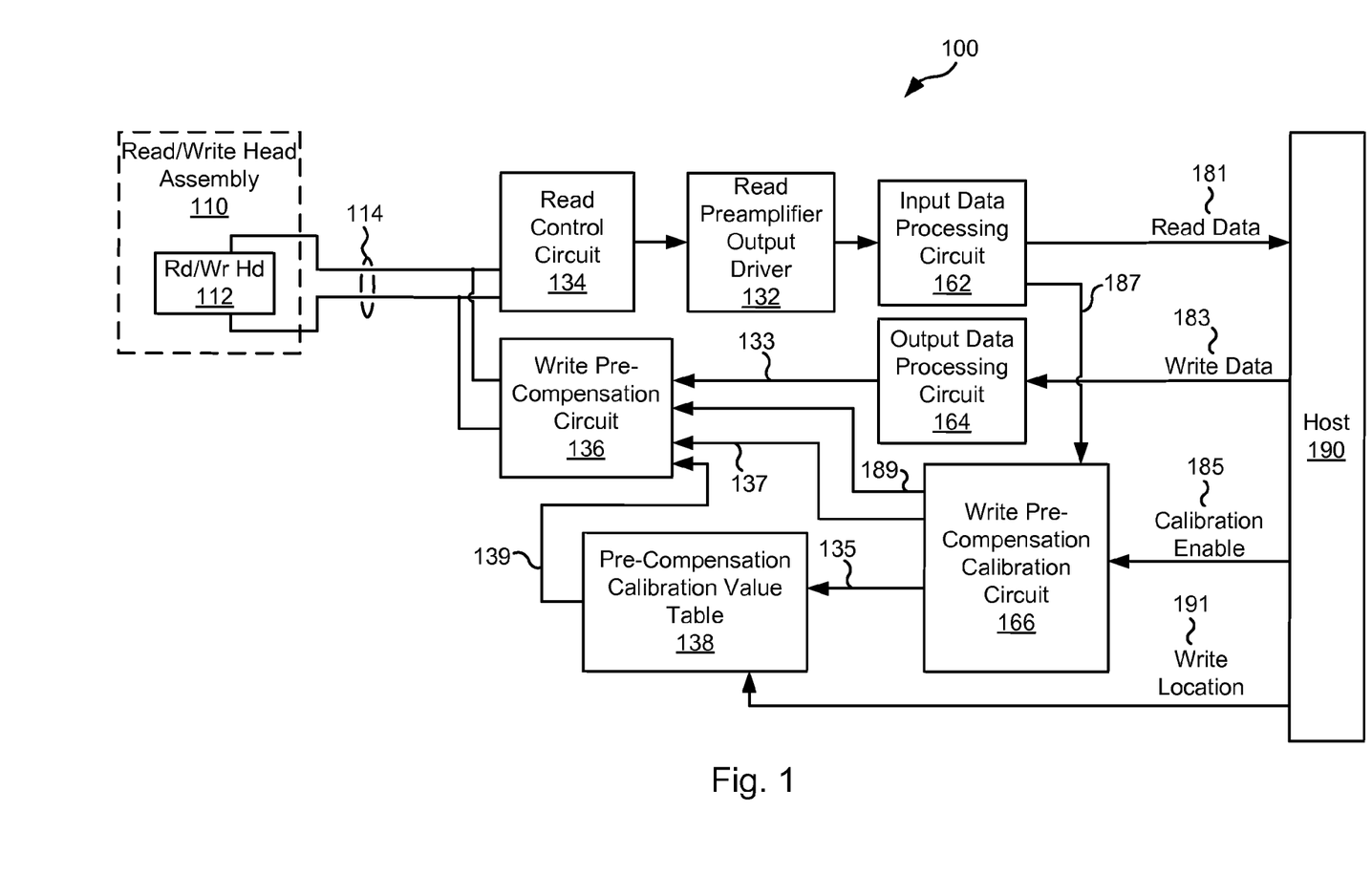
FIG. 1 shows a block diagram of a data read/write circuit including write pre-compensation calibration circuit in accordance with some embodiments of the present invention.

Turning to FIG. 1, a block diagram of a data read/write circuit 100 including a write pre-compensation calibration circuit 166 is shown in accordance with some embodiments of the present invention. Data read/write circuit 100 includes a read/write head assembly 110 that has a read/write head 112. Read/write head 112 writes data corresponding to a data signal 114 to the storage medium or senses data stored on the storage medium and provides the sensed data as data signal 114. Data signal 114 is either provided by a read/write control circuit 134 or received by read/write control circuit 134. Where a data write is requested by host 190, host 190 provides write data 183 to an output processing circuit 164. Output processing circuit 164 encodes write data 183 into codewords. The codewords are provided to read/write control circuit 134. Read/write control circuit 134 converts the codewords to a series of current levels provided as data signal 114 to read/write head 112. The current causes read/write head 112 to magnetize the storage medium corresponding to the current.

A read control circuit 134 receives data signal 114 during a read operation and provides it to a read preamplifier output driver 132. Read preamplifier output driver 132 amplifies the voltage values and provides the amplified analog signal to an input data processing circuit 162. Input data processing circuit 162 applies a data processing algorithm to the received data to recover the originally written data set. The originally written data set is provided as read data 181 to host 190. In some embodiments of the present invention, the data processing algorithm includes a data detection algorithm and a data decode algorithm. The data detection algorithm may be a maximum a posteriori data detection algorithm, and the data decode algorithm may be a low density parity check algorithm. Based upon the disclosure provided herein, one of ordinary skill in the art will recognize a variety of data processing algorithms that may be implemented by input data processing circuit 162.

In addition, input data processing circuit 162 provides a quality indicator 187 that is a value corresponding to the quality of the data received that is ultimately processed to yield write data 181. Quality indicator 187 may be any indication of quality including, but not limited to, a bit error rate for the data used to derive read data 181, a sum of the log-likelihood ratio values (i.e., soft values for the data) for the data used to derive read data 181, or a minimum mean squared error value the data used to derive read data 181. Based upon the disclosure provided herein, one of ordinary skill in the art will recognize other indications of quality that may be used in accordance with different embodiments of the present invention.

During a write operation, host 190 provides write data 183 that is to be stored to a storage medium. Write data 183 is encoded by an output data processing circuit 164 to yield an encoded output 133 that is provided to a write pre-compensation circuit 136. Write pre-compensation circuit 136 may be any circuit or system known in the art that is capable of pre-compensating a write signal to adjust for interference between proximate data written to a storage medium. Such write pre-compensation considers preceding bit patterns in the process of generating a magnetic field to write a succeeding bit pattern as is known in the art. As signal to be written to the storage medium may be moved either forward or backward depending upon the preceding bit pattern such that when it is later sensed from the storage medium it may be more easily understood. The amount of write pre-compensation applied depends upon which region of the storage medium is to be written, and a pre-compensation calibration value table 138 includes a number of region specific pre-compensation values 139 that are used in applying the appropriate write pre-compensation to encoded output 133. The region being written is indicated by write location data 191 provided from host 190 to pre-compensation calibration value table 138. In some embodiments of the present invention, the region of the storage medium is a track on the storage medium. In such embodiments, pre-compensation calibration value table 138 stores a write pre-compensation value corresponding to each track on the storage medium that are selected based upon write location data 191 and provided as region specific pre-compensation values 139. Based upon the disclosure provided herein, one of ordinary skill in the art will recognize other regions that may be used in relation to different embodiments of the present invention.

Write pre-compensation circuit 136 provides compensated encoded output 133 as data signal 114. Data signal 114 is a series of current levels provided as data signal 114 to read/write head 112. The current causes read/write head 112 to magnetize the storage medium corresponding to the current.

Write pre-compensation calibration circuit 166 is operable to determine region specific pre-compensation values 139 that are written to pre-compensation calibration value table 138. A calibration period is controlled by a host 190 that asserts a calibration enable 185 and providing write data 183 to output data processing circuit 164. During the calibration period, write pre-compensation circuit 136 uses test pre-compensation values 137 in place of region specific pre-compensation values 139 when a test enable signal 189 is asserted. Test enable signal 189 is asserted coincident with calibration enable 185.

In operation, write pre-compensation calibration circuit 166 provides a series of test pre-compensation values 137 that are used as encoded output 133 is repeatedly written over a region of the storage medium. Each time encoded output 133 is written to a sub-region of the region of the storage medium, write pre-compensation calibration circuit 166 provides a different test pre-compensation value 137 that is used by write pre-compensation circuit 136 to generate data signal 114. In some embodiments of the present invention where the region is a track and the sub-regions are sectors along the track, encoded data 133 is repeatedly written to consecutive sectors in a given track of the storage medium. The value of test pre-compensation values 137 is changed for each sector. Thus, each sector of a given track is written with the same encoded data 133 using a different test pre-compensation value 137 for each sector.

The region is read by read/write head assembly 110 and processed by input data processing circuit 162. As each sub-region of the region is read, input data processing circuit 162 provides read data 181 corresponding to the sub-region along with quality indicator 187. Quality indicator 187 is provided to write pre-compensation calibration circuit 166 that stores the respective quality values 187 for each sub-region within the region. At the end of reading and processing data from the region, write pre-compensation calibration circuit 166 identifies the sub-region within the region that exhibited the highest quality value 187. Write pre-compensation calibration circuit 166 then selects test pre-compensation value 137 that was used to write the identified sub-region, and this selected test pre-compensation value 137 is provided as a region pre-compensation value 135 to pre-compensation calibration value table 138 where it is stored for use whenever the corresponding region of the storage medium is to be written. This process is repeated for a number of regions of the storage medium with respective region pre-compensation values 135 being stored to pre-compensation calibration value table 138.

In some embodiments of the present invention, the regions are tracks on the storage medium and the sub-regions are sectors. In such embodiments, each sector is read and read data 181 corresponding to the sector is provides along with quality indicator 187. Quality indicator 187 is provided to write pre-compensation calibration circuit 166 that stores the respective quality values 187 for each sector along the track. At the end of reading and processing data from the track, write pre-compensation calibration circuit 166 identifies the sector within the region that exhibited the highest quality value 187. Write pre-compensation calibration circuit 166 then selects test pre-compensation value 137 that was used to write the identified sector, and this selected test pre-compensation value 137 is provided as a track pre-compensation value 135 to pre-compensation calibration value table 138 where it is stored for use whenever the corresponding track of the storage medium is to be written. This process is repeated for a number of tracks of the storage medium with respective region pre-compensation values 135 being stored to pre-compensation calibration value table 138.

Figure 2A:
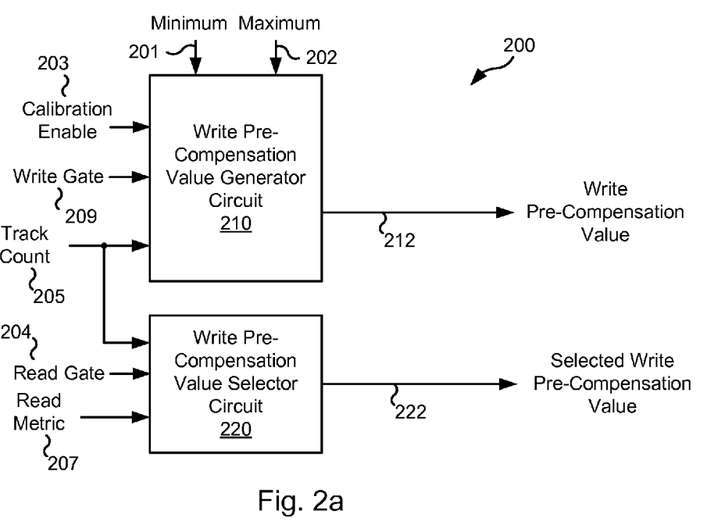
FIG. 2a shows an example implementation of a write pre-compensation calibration circuit in accordance with particular embodiments of the present invention.

Turning to FIG. 2*a*, an example implementation of a write pre-compensation calibration circuit 200 is shown in accordance with particular embodiments of the present invention. Write pre-compensation calibration circuit 200 may be used in place of write pre-compensation calibration circuit 166. In such a situation, a calibration enable 203 is connected to calibration enable 185, a write pre-compensation value 212 is connected to test pre-compensation value 137, and a read metric 207 is connected to quality value 187, and a selected write pre-compensation value 222 is connected to region compensation value 135. Write pre-compensation calibration circuit 200 includes a write pre-compensation value generator circuit 210 and a write pre-compensation value selector circuit 220.

Write pre-compensation value generator circuit 210 is a counter circuit that is initialized to a minimum value 201 whenever a calibration enable is initially asserted to cause a calibration process and whenever a track count 205 is changed. When the initialization occurs, write pre-compensation value 212 is asserted equal to minimum value 201. Each time a write gate 209 is asserted, the counter is incremented resulting in a change in the value of write pre-compensation value 212. Write gate 209 remains asserted as a sector within the track indicated by track count 205. Thus, a different write pre-compensation value 212 is provided for each sector that is written. The different values of write pre-compensation value 212 are generated by incrementing the counter. The counter roles over at a maximum value 202.

As the data is being read from the storage medium, a track from which the data is being read is indicated by track count 205. As data from the track is read, read gate 204 is asserted corresponding to each sector being read. Each time read gate 204 is asserted a sector counter included in write pre-compensation value selector circuit 220 is incremented. The resulting sector count is used to store read metric 207 to a buffer. Once track count 205 changes, all of the values of read metric 207 for the track have been received. Once this is the case, write pre-compensation value selector circuit 220 identifies the highest value (i.e., the value indicating the highest quality of the read data) of read metric 207 that was buffered during the track, and the sector count corresponding to the identified highest value of read metric 207 is selected. Write pre-compensation value selector circuit 220 then correlates the selected sector count with write pre-compensation value 212 that was originally used to write the selected sector. This particular write pre-compensation value 212 is provided as selected write pre-compensation value 222 that is stored to the pre-compensation value table.

Figure 2B:
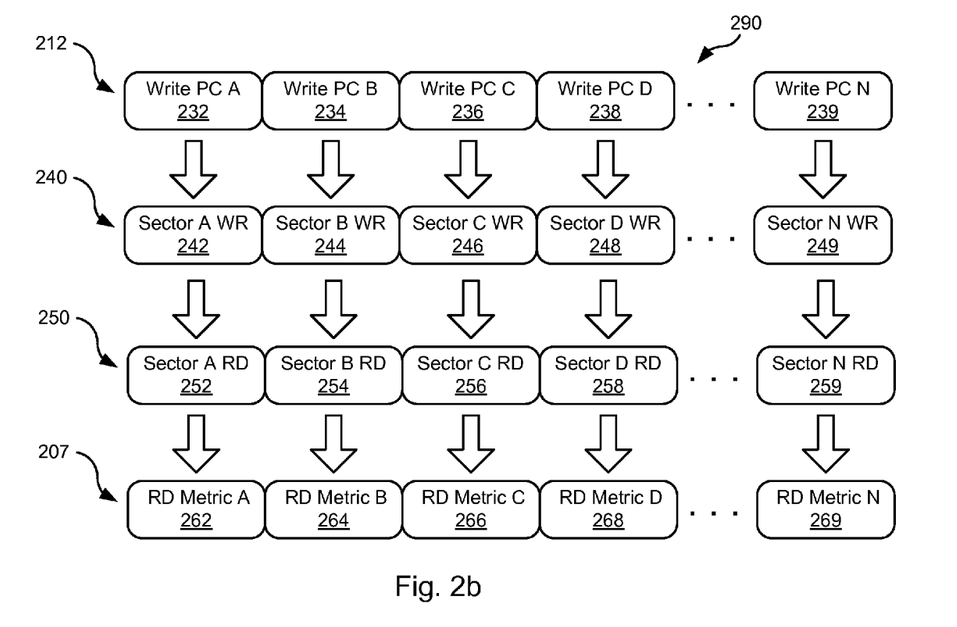

Turning to FIG. 2b, a graphical depiction 290 of an example write pre-compensation calibration process that may be implemented by the data read/write circuit of FIG. 1 including the write pre-compensation calibration circuit of FIG. 2a is provided. As shown, a series of write pre-compensation values 212 are provided (i.e., Write PC A 232, Write PC B 234, Write PC C 236, Write PC D 238, and Write PC N 239). Each of the write pre-compensation values 212 are used to write a data set 240 (i.e., Sector A WR 242, Sector B WR 244, Sector C WR 246, Sector D WR 248, and Sector N WR 249) to a sector on a storage medium. Later each sector is read yielding data sets 250 (i.e., Sector A RD 242, Sector B RD 244, Sector C RD 246, Sector D RD 248, and Sector N RD 259) from the storage medium. The processing the aforementioned read data results in a read metric 207 for each sector (i.e., RD Metric A 262, RD Metric B 264, RD Metric C 266, RD Metric D 268, and RD Metric N 269). In turn, write pre-compensation value selector circuit 220 identifies the highest value (i.e., the value indicating the highest quality of the read data) of RD Metric A 262, RD Metric B 264, RD Metric C 266, RD Metric D 268, and RD Metric N 269. Then, write pre-compensation value selector circuit 220 selects the write pre-compensation value 212 corresponding to the identified read metric 207. The selected write pre-compensation value 212 is provided as selected write pre-compensation value 222 for use in later writes to the track. As a particular example, assume RD Metric B 264 is identified as the highest value of read metric 207. In such a case, write pre-compensation value selector circuit 220 selects Write PC B 234 as selected write pre-compensation value 222 for use in later writes to the track.

Figure 3A:
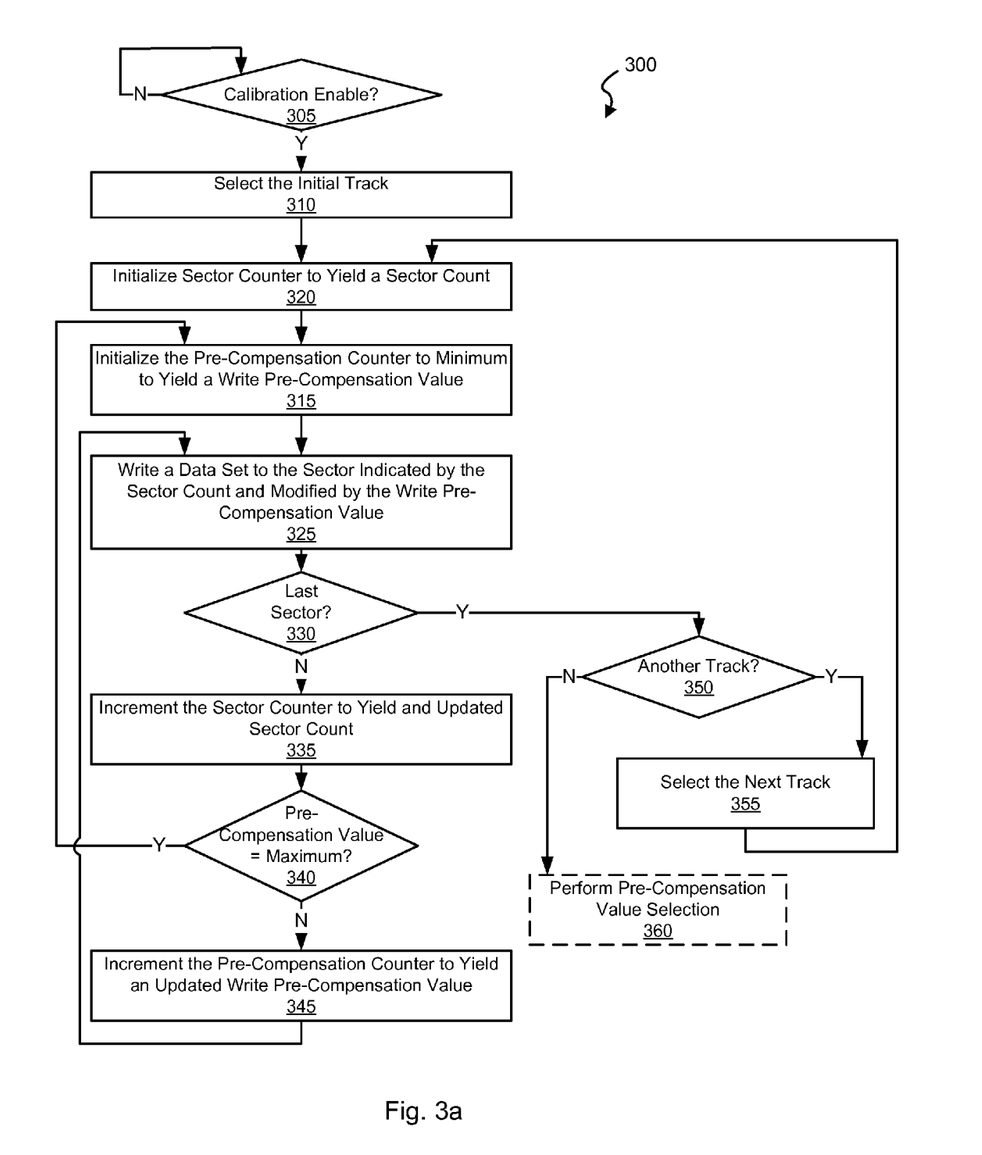
FIGS. 3a-3b are flow diagrams showing a method in accordance with some embodiments of the present invention for determining and using write pre-compensation values.
Figure 3B:
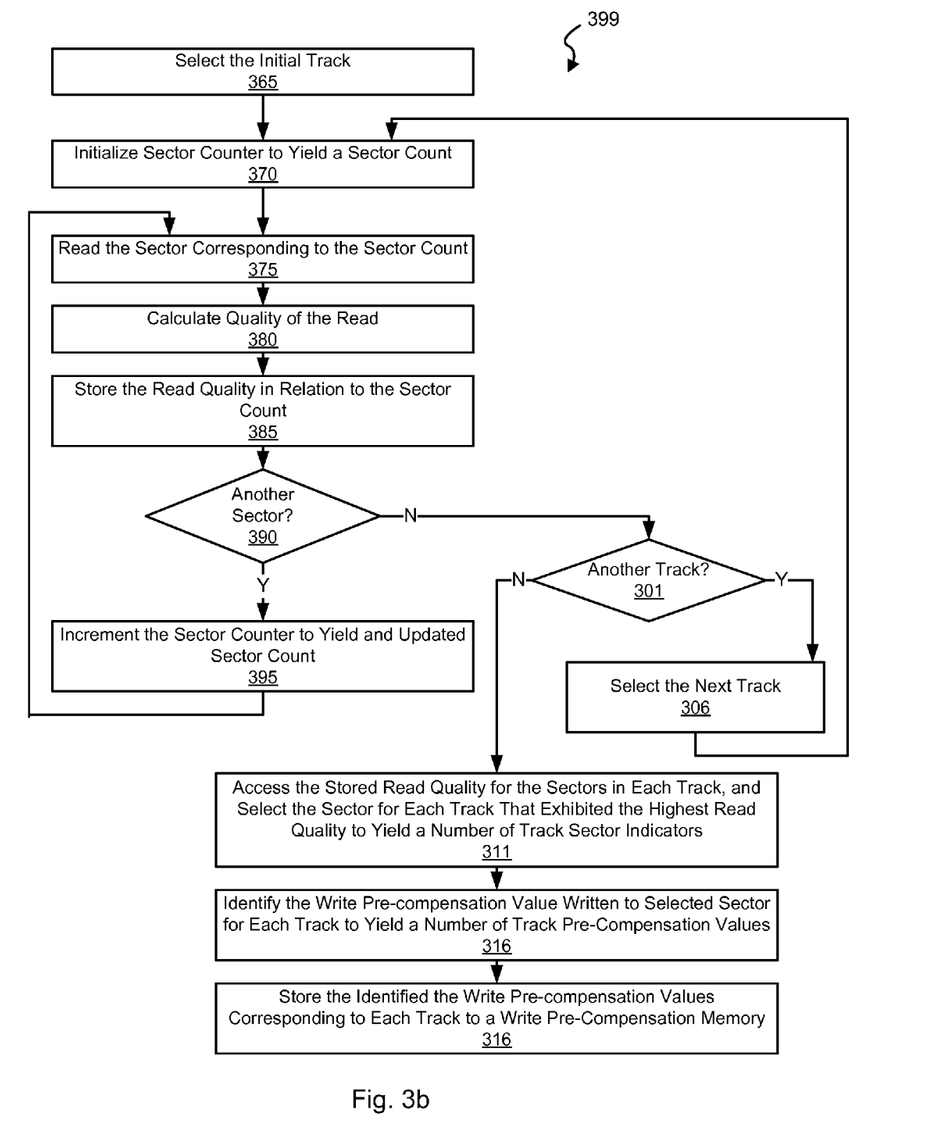

Turning to FIGS. 3a-3b, flow diagrams 300, 399 show a method in accordance with some embodiments of the present invention for determining and using write pre-compensation values. Following flow diagram 300 of FIG. 3a, it is determined whether a calibration enable has been asserted (block 305). The calibration enable indicates that a request to update or calibration of write pre-compensation values has been requested. When such a calibration is requested, generated write pre-compensation values are used in place of write pre-compensation values maintained in a buffer for use during standard data writes. Where a calibration enable is asserted (block 305), an initial track for calibration is selected (block 310) and a sector counter is initialized to yield a sector count (block 320).

A pre-compensation counter that is operable to yield a write pre-compensation value is initialized to a minimum (block 315). A data set is written to the sector on the storage medium indicated by the sector count (block 325). The data write is done using the write pre-compensation value from block 315). It is determined whether the currently written sector is the last sector in the track (block 330). Where additional sectors are to be written (block 330), the sector counter is incremented to yield an updated sector count (block 335).

It is then determined whether the write pre-compensation value is a maximum (block 340). Where the write pre-compensation value is not a maximum (block 340), the pre-compensation counter is incremented to yield an updated write pre-compensation value (block 345). The processes of blocks 325, 330, 335, 340 are repeated using the updated write pre-compensation value. Alternatively, where the write pre-compensation value is a maximum (block 340), the pre-compensation counter is re-initialized to the minimum (block 320), and the processes of blocks 325, 330, 335, 340 are repeated using the updated write pre-compensation value.

Alternatively, where no additional sectors remain to be written (block 330), it is determined whether another track remains to be calibrated (block 350). Where another track remains to be calibrated (block 350), the next track is selected (block 355), the processes of blocks 320, 315, 325, 330, 335, 340 are repeated for the next track. Alternatively, where no tracks remain to be calibrated (block 350), pre-compensation value selection is performed (block 360).

Turning to FIG. 3b, pre-compensation value selection is performed (block 399) is shown as flow diagram 399. Following flow diagram 399, an initial track for reading is selected (block 365) and the sector counter is initialized to yield a sector count (block 370). The sector corresponding to the sector count is read (block 375). The sector data is then processed. As part of processing the sector data, a quality of the data (i.e., a read quality) is calculated (block 380). The calculated quality may be, but is not limited to, a bit error rate for the sector, a sum of the log-likelihood ratio values (i.e., soft values for the data) within the sector, or a minimum mean squared error value within the sector. The read quality is stored in relation to the sector count (block 385).

It is determined whether another sector remains to be processed within the track (block 390). Where another sector remains to be processed (block 390), the sector counter is incremented to yield an updated sector count (block 395), and the processes of blocks 375, 380, 385, 390, 395 are repeated for the updated sector count. Where additional tracks remain to be processed (block 301), the next track is selected (block 306) and the processes of blocks 370, 375, 380, 385, 390, 395, 301 are repeated for the next track.

Once all of the sectors within the track have been processed (block 390), it is determined whether another track remains to be processed (block 301). Where no tracks remain to be processed (block 301), the read quality for the sectors in each track are accessed, the sector within each track that exhibited the highest read quality is selected to yield a number of sector indicators (block 311). The pre-compensation values used when the selected sectors were originally written are identified (block 316). The identified write pre-compensation values corresponding to each track are written to a write pre-compensation memory (block 316) where they are maintained for use in relation to future data writes to the respective tracks on the storage medium.

Figure 4:
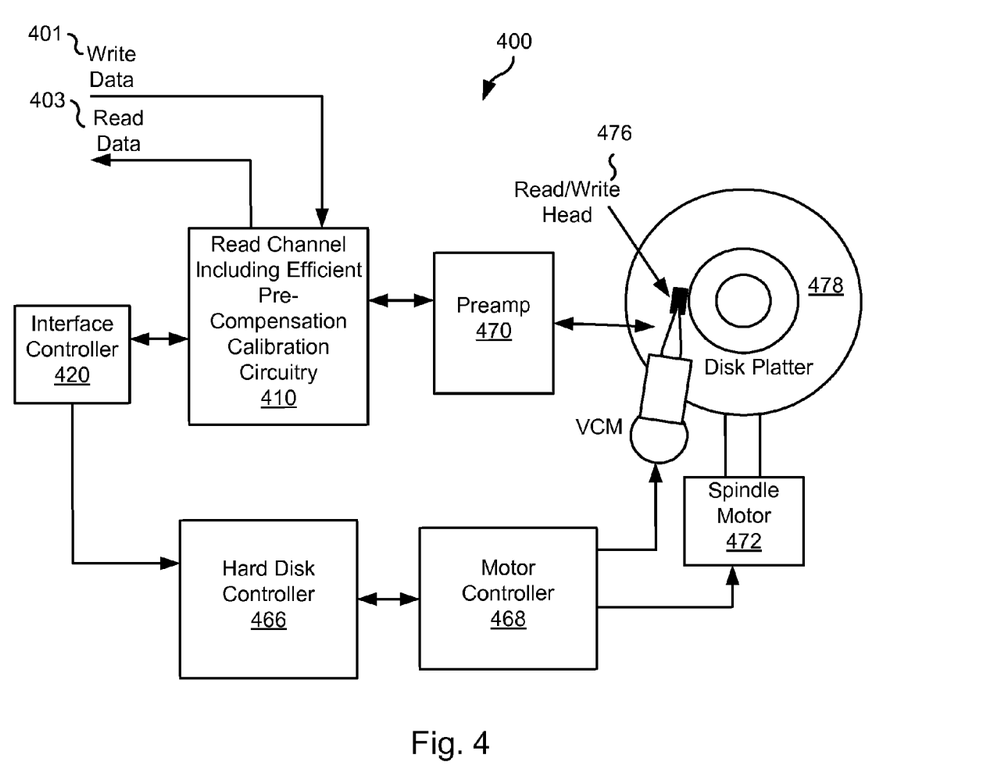
FIG. 4 depicts a storage system with a read channel including efficient pre-compensation calibration circuitry in accordance with various embodiments of the present invention.

Turning to FIG. 4, a storage system 400 including a read channel circuit 410 having efficient pre-compensation calibration circuitry is shown in accordance with some embodiments of the present invention. Storage system 400 may be, for example, a hard disk drive. Storage system 400 also includes a preamplifier 470, an interface controller 420, a hard disk controller 466, a motor controller 468, a spindle motor 472, a disk platter 478, and a read/write head assembly 476. A host 490 is responsible for providing read and write commands to storage system 400 via interface controller 420, and read channel circuit 410. Interface controller 420 controls addressing and timing of data to/from disk platter 478 in accordance with commands received from host 490. The data on disk platter 478 consists of groups of magnetic signals that may be detected by read/write head assembly 476 when the assembly is properly positioned over disk platter 478. In one embodiment, disk platter 478 includes magnetic signals recorded in accordance with either a longitudinal or a perpendicular recording scheme.

In a typical read operation, read/write head assembly 476 is accurately positioned by motor controller 468 over a desired data track on disk platter 478. Motor controller 468 both positions read/write head assembly 476 in relation to disk platter 478 and drives spindle motor 472 by moving read/write head assembly to the proper data track on disk platter 478 under the direction of hard disk controller 466. Spindle motor 472 spins disk platter 478 at a determined spin rate (RPMs). Once read/write head assembly 478 is positioned adjacent the proper data track, magnetic signals representing data on disk platter 478 are sensed by read/write head assembly 476 as disk platter 478 is rotated by spindle motor 472. The sensed magnetic signals are provided as a continuous, minute analog signal representative of the magnetic data on disk platter 478. This minute analog signal is transferred from read/write head assembly 476 to read channel circuit 410 via preamplifier 470. Preamplifier 470 is operable to amplify the minute analog signals accessed from disk platter 478. In turn, read channel circuit 410 decodes and digitizes the received analog signal to recreate the information originally written to disk platter 478. This data is provided as read data 403 to a receiving circuit. A write operation is substantially the opposite of the preceding read operation with write data 401 being provided to read channel circuit 410. This data is then encoded and written to disk platter 478.

During operation, a data set is written to a number of sectors on a given track of disk platter 478 with each sector being written using a different write pre-compensation value generated for the particular sector. Once the track has been written with sectors each being written using the different write pre-compensation values, the data from the sectors is read from disk platter 478 and processed by read channel circuit 410. The processing yields a quality metric for each of the sectors, and this quality metric is used as an indicator of an appropriate write pre-compensation value for the particular track. In particular, the write pre-compensation value used to write the sector that exhibited the highest quality is chosen as the write pre-compensation value that will be used during future writes to the particular track. The chosen write pre-compensation value is stored to a memory from which it can be accessed during future writes to the track on disk platter 478. The process may be repeated for each track on disk platter 478 resulting in the memory storing a write pre-compensation value for use within each of the respective tracks. In some embodiments, the generation and selection of write pre-compensation values is done similar to that discussed above in relation to FIGS. 3a-3b, and/or using circuitry similar to that discussed above in relation to FIG. 1.

It should be noted that storage system 400 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 400, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 400 may be modified to include solid state memory that is used to store data in addition to the storage offered by disk platter 478. This solid state memory may be used in parallel to disk platter 478 to provide additional storage. In such a case, the solid state memory receives and provides information directly to read channel circuit 410. Alternatively, the solid state memory may be used as a cache where it offers faster access time than that offered by disk platted 478. In such a case, the solid state memory may be disposed between interface controller 420 and read channel circuit 410 where it operates as a pass through to disk platter 478 when requested data is not available in the solid state memory or when the solid state memory does not have sufficient storage to hold a newly written data set. Based upon the disclosure provided herein, one of ordinary skill in the art will recognize a variety of storage systems including both disk platter 478 and a solid state memory.

A data decoder circuit used in relation to read channel circuit 410 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In conclusion, the invention provides novel systems, devices, methods and arrangements for performing write pre-compensation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A storage device, the storage device comprising:
   a storage medium including a region and at least a first sub-region and a second sub-region within the region;
   a calibration circuit operable to:
   generate a first pre-compensation value and a second pre-compensation value;
   write data to the first sub-region using the first pre-compensation value;
   write data to the second sub-region using the second pre-compensation value;
   read the first sub-region;
   calculate a first quality of a data set read from the first sub-region;
   read the second sub-region;

calculate a second quality of a data set read from the second sub-region; and compare the first quality with the second quality to yield a compare value, and based at least in part on the compare value, select one of the first pre-compensation value and the second pre-compensation value as a selected pre-compensation value.

2. The storage device of claim 1, wherein the first quality is selected from a group consisting of: a bit error rate of the first sub-region, a sum of the log-likelihood ratio values within the first sub-region, and a minimum mean squared error value within the first sub-region.

3. The storage device of claim 1, wherein the device further comprises:

a memory operable to store the selected pre-compensation value.

4. The storage device of claim 1, wherein the calibration circuit is implemented as part of an integrated circuit.

5. The storage device of claim 1, wherein the storage device further comprises:

a solid state memory.

6. The storage device of claim 1, wherein the calibration circuit includes a counter circuit, and wherein the counter circuit is incremented to generate the first pre-compensation value and the second pre-compensation value.

7. The storage device of claim 1, wherein the first quality indicates a greater quality than the second quality, and wherein the first pre-compensation value is selected as the selected pre-compensation value.

8. The storage device of claim 1, wherein the region is a track on the storage medium, and wherein the first sub-region is a first sector on the track and the second sub-region is a second sector on the track.

9. The storage device of claim 1, wherein the selected pre-compensation value is a first selected pre-compensation value, wherein the region is a first region, wherein the storage medium includes a second region comprising at least a third sub-region and a fourth sub-region within the second region, and wherein the calibration circuit is further operable to:

generate a third pre-compensation value and a fourth pre-compensation value;

write data to the third sub-region using the third pre-compensation value;

write data to the fourth sub-region using the fourth pre-compensation value;

read the third sub-region;

calculate a third quality of a data set read from the third sub-region;

read the fourth sub-region;

calculate a fourth quality of a data set read from the fourth sub-region; and based at least in part on the third quality and the fourth quality, selecting one of the third pre-compensation value and the fourth pre-compensation value as a second selected pre-compensation value.

10. The storage device of claim 1, wherein the storage device is included as part of a redundant array of independent disks.

11. A calibration circuit, the circuit comprising:

a counter circuit operable to generate a first pre-compensation value corresponding to a first count output of the counter circuit, and to generate a second pre-compensation value corresponding to a second count output of the counter circuit;

a write circuit operable to:

write data to a first region of a storage medium using the first pre-compensation value; and write data to a second region of the storage medium using the second pre-compensation value;

a read circuit operable to:

read the first region to yield a first read data set, and to calculate a first quality corresponding to the first data set;

read the second region to yield a second read data set, and to calculate a first quality corresponding to the first data set;

a pre-compensation value selector circuit operable to compare the first quality with the second quality to yield a compare value, and select one of the first pre-compensation value and the second pre-compensation value based at least in part on the compare value.

12. The calibration circuit of claim 11, wherein the calibration circuit is implemented as part of an integrated circuit.

13. The calibration circuit of claim 11, wherein the calibration circuit further comprises:

a memory operable to store the selected pre-compensation value.

14. The calibration circuit of claim 11, wherein the first quality is selected from a group consisting of: a bit error rate of the first region, a sum of the log-likelihood ratio values within the first region, and a minimum mean squared error value within the first region; and wherein the second quality is selected from a group consisting of: a bit error rate of the second region, a sum of the log-likelihood ratio values within the second region, and a minimum mean squared error value within the second region.

15. The calibration circuit of claim 11, wherein the first region is a first sector on the storage medium, and the second region is a second sector on the storage medium.

16. The calibration circuit of claim 11, wherein the first quality indicates a greater quality than the second quality, and wherein the first pre-compensation value is selected as the selected pre-compensation value.

17. A method for pre-compensation calibration, the method comprising:

generating a first pre-compensation value and a second pre-compensation value using a counter circuit;

writing data to a first region of a storage medium using the first pre-compensation value;

writing data to a second region of the storage medium using the second pre-compensation value;

reading the first region to yield a first data set;

calculating a first quality of the first data set;

reading the second region to yield a second data set;

calculating a second quality of the second data set; and comparing the first quality with the second quality to yield a compare value, and based at least in part on the compare value, selecting one of the first pre-compensation value and the second pre-compensation value as a selected pre-compensation value.

18. The method of claim 17, wherein:

the first quality is selected from a group consisting of: a bit error rate of the first region, a sum of the log-likelihood ratio values within the first region, and a minimum mean squared error value within the first region; and the second quality is selected from a group consisting of: a bit error rate of the second region, a sum of the log-likelihood ratio values within the second region, and a minimum mean squared error value within the second region.

19. The method of claim 17, wherein the method further comprises:

storing the selected pre-compensation value.

20. The method of claim 17, wherein the first quality indicates a greater quality than the second quality, and wherein the first pre-compensation value is selected as the selected pre-compensation value.

21. The method of claim 17, wherein the first region is a first sector on the storage medium, and the second region is a second sector on the storage medium.

\* \* \* \* \*